A. Dewey. Feed Apparatus.
117267 — Patented Jul 25 1871
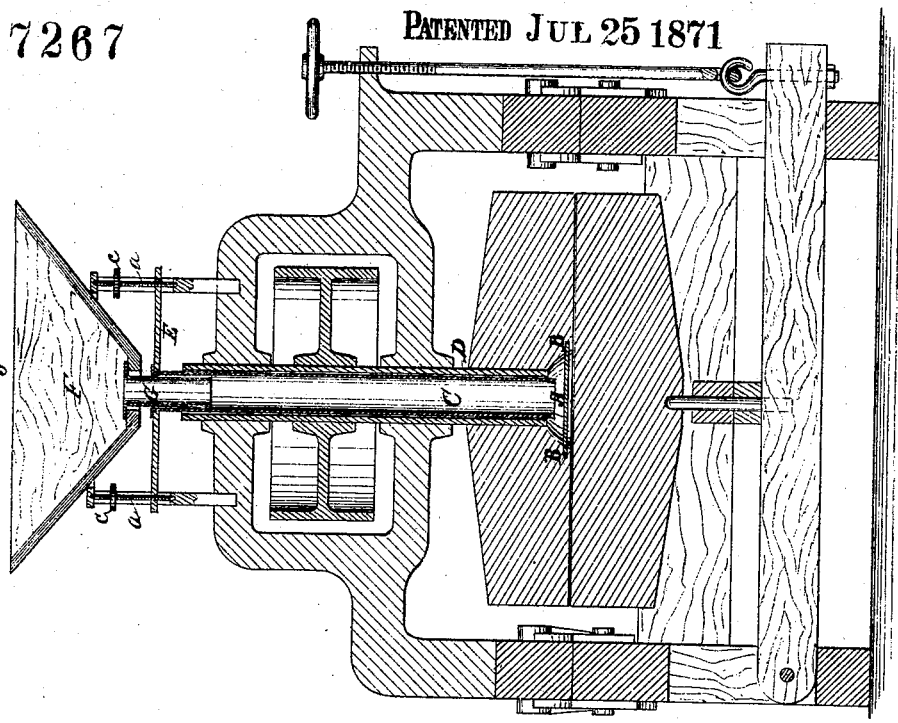
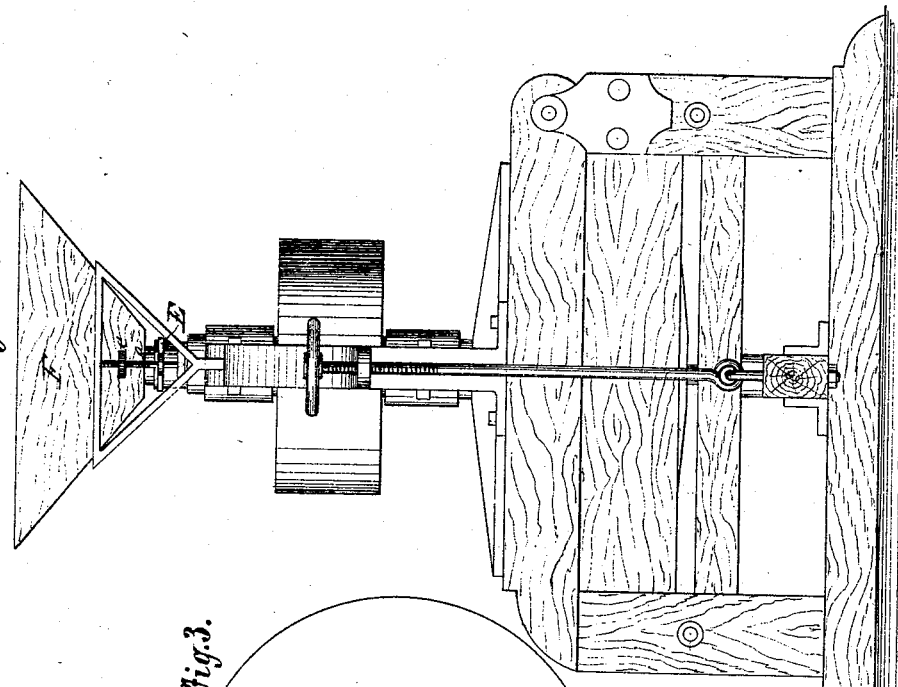
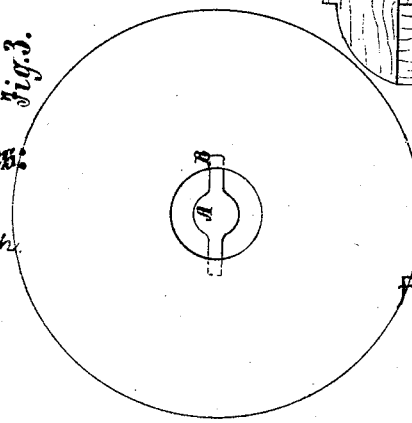
Witnesses:
A Bennerkendorf
Wm H. E. Smith
Inventor:
A. Dewey
Per Mmm & Co
Attorneys.

UNITED STATES PATENT OFFICE.

ALVAH DEWEY, OF PRINCETON, KENTUCKY.

IMPROVEMENT IN FEED APPARATUS FOR MILLSTONES.

Specification forming part of Letters Patent No. 117,267, dated July 25, 1871.

*To all whom it may concern:*

Be it known that I, ALVAH DEWEY, of Princeton, in the county of Caldwell and State of Kentucky, have invented a new and Improved Feed Apparatus for Millstones; and I do hereby declare that the following is a full, clear, and exact description thereof, which will enable others skilled in the art to make and use the same, reference being had to the accompanying drawing forming part of this specification.

This invention relates to improvements in the feed apparatus of millstones in which the upper and running stone is suspended on a tube by which it is rotated, and another tube, which does not revolve, is employed for conducting the grain down through the first to a short distance above the bed-stone; and the invention consists in the combination, with this conducting-tube, of a disk or plate which is secured in the enlarged eye of the runner, and has for its office to spread the grain and facilitate its passage between the surfaces of the stones, as hereinafter set forth.

Figure 1 of drawing is a sectional elevation of a mill or grinding apparatus, showing my improvements applied. Fig. 2 is a front elevation, and Fig. 3 a top view of the same.

A is a disk or plate of smooth metal, of any suitable kind, and nearly equal in size to the eye of the runner, which is enlarged at the bottom, as shown. The said plate is secured in place by ears B B, which enter the runner at the walls of the eye. It is designed to receive the grain on its upper surface, and throw it off in all directions for equalizing the feed. The runner is attached to a tube, D, which extends upward through the frame of the mill, and is rotated by a pulley or band-wheel. From the bottom of the hopper F the communication with said tube is made by a short and smaller tube, G. The hopper rests in a suitable frame or support, with which screw-rods $a\ a$, provided with hand-wheels $c\ c$, are arranged as shown. These screw-rods pass through the ends of a cross-bar, E, from the center of which depends and is supported a tube, C, which extends into close proximity with the plate A. Thus, by turning the screw-rods $a\ a$ the bar E is vertically adjusted, and with it the tube C, which has the effect of delivering the grain upon the disk in greater or lesser quantities, according as its kind, quality, or other conditions may dictate or require.

What I claim is—

The combination of the disk or plate A with the tube C, bar E, and rods $a\ a$, as shown and described.

ALVAH DEWEY.

Witnesses:
L. POPPER,
D. H. ARMSTRONG.